Sept. 23, 1930.  F. W. HARNEY  1,776,256
SEVERING MECHANISM FOR BOARD MAKING MACHINES
Filed May 8, 1928
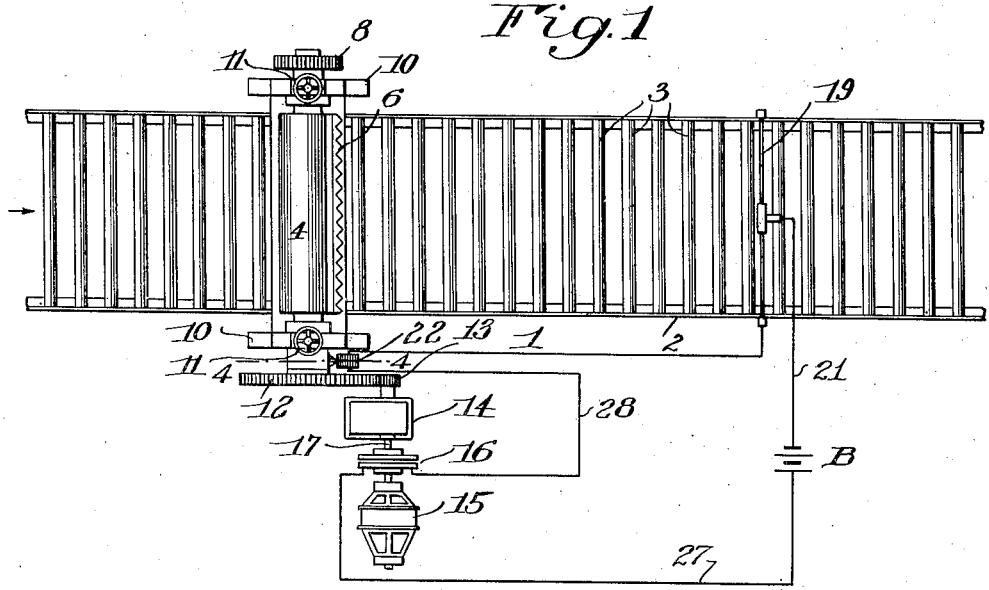
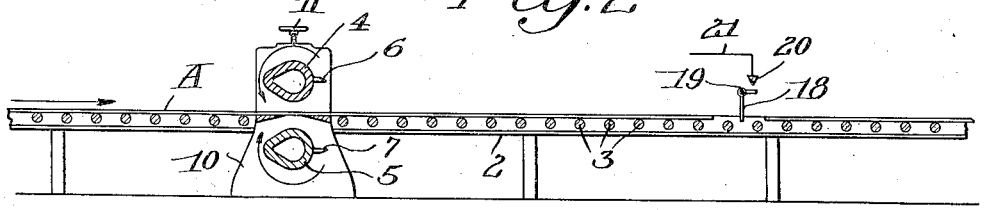
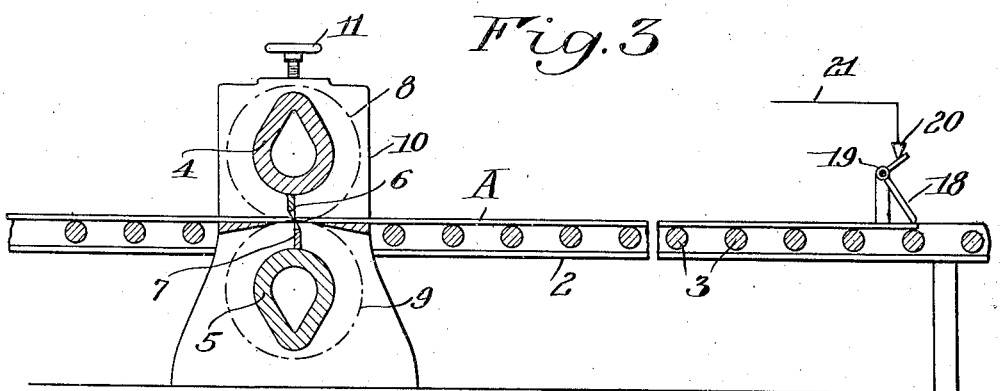
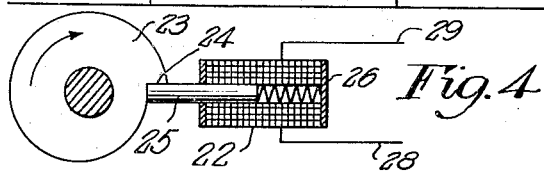
INVENTOR
Francis W. Harney
BY
his ATTORNEYS Patented Sept. 23, 1930

1,776,256

UNITED STATES PATENT OFFICE

FRANCIS W. HARNEY, OF LOCKPORT, NEW YORK, ASSIGNOR TO THE UPSON COMPANY, OF LOCKPORT, NEW YORK, A CORPORATION OF NEW YORK

SEVERING MECHANISM FOR BOARD-MAKING MACHINES

Application filed May 8, 1928. Serial No. 276,176.

My present invention relates to the manufacture of sheets and boards as a continuous process such as in the manufacture of composite, laminated and similar kinds of wall board used in building constructions and ordinarily made either entirely of paper stock or with a body portion of inorganic material faced with paper liners. The object of this invention is to provide mechanism whereby the product, issuing in the continuous strip or sheet, is cut into lengths suitable for handling and use in building construction. The improvements are directed in part toward providing a simple, efficient and durable mechanism of this kind that will function in the capacity outlined while the product is continuously traveling from the making machine to the point of delivery.

To these and other ends the invention resides in certain improvements and combinations of parts, all as will be hereinafter more fully described, the novel features being pointed out in the claim at the end of the specification.

In the drawings:

Fig. 1 is a plan view of a fragment of the delivery end of a board making machine provided with a severing device construction in accordance with and illustrating one embodiment of my invention;

Fig. 2 is a longitudinal central section therethrough with the parts in one position;

Fig. 3 is an enlarged view corresponding to Fig. 2 but partially broken away showing the part in the severing position; and Fig. 4 is a detail of the stop mechanism for the rotary cutters and the solenoid control as they appear in section on line 4—4 of Fig. 1.

Similar reference numerals throughout the several views indicate the same parts.

Referring more particularly to the drawings, 1 indicates generally a run way at the delivery end of a board making machine comprising a supporting frame or tube carrying suitable bed rollers 3 on which the finished board is carried as indicated at A. At a suitable point the bed is bridged by a pair of upper and lower rotary knife carrying elements 4 and 5. The knives carried by these elements are indicated respectively at 6 and 7. Their normal position is that shown in Fig. 2. The rotary elements 4 and 5 are connected for joint movement by intermeshing gears 8 and 9. They are supported on a suitable framework 10 provided with hand wheels 11 through which their bearings are adjusted toward and from each other to provide the proper shearing cooperation of the knives. One of the rotary elements has a driving gear 12 which is itself driven by a pinion 13 on a gear box 14. The purpose of the gear box is to reduce the speed of a motor 15 acting through a magnetic clutch 16 on the shaft 17 of the gear box.

The rollers 3 beyond the shearing device or to the right of the shearing device when viewed as in Figures 1, 2, and 3, are driven at a substantially faster rate than the rollers before or to the left of the cutter. Preferably the rollers beyond the cutter are driven approximately four times as fast as the rollers before the cutter. From this it follows that as soon as the shears cut the strip of sheet material, the severed strip will move forward quite rapidly relative to the portion behind it and until the next cut is made there will be a gradually widening space between the rear edge of the severed sheet and the advancing edge of the following strip.

At a suitably distant point beyond the severing knives is arranged a trip 18 pivoted at 19, which trip is adapted to be actuated by the advancing edge of a section of board. When so actuated from the position in Fig. 2 to that of Fig. 3, it makes a contact at 20 through a line indicated generally at 21 that energizes the electric clutch 16 and places the rotary knife members 4 and 5 under power. The knife members 6 and 7 are thereby rotated from the position in Fig. 2 to that of Fig. 3 and come together in such a way that they sever the traveling sheet A. Their rotation, as shown by the arrows, is in the same direction as that, also shown by the arrows, of the traveling sheet and at a peripheral speed the same as the rectilinear progress of the sheet through the machine with the result that the newly made board is automatically severed without interfering with its continuous progress.

After these circuit actuations by the trip 18, it returns to its normal position of Fig. 2 until the advancing edge of the severed board strikes it again, upon which condition the cycle is repeated.

In the meantime, and after the severing operation has occurred and while the trip 18 is traveling upon the surface of the board in the position of Fig. 3, it operates a solenoid 22 that withdraws and holds withdrawn a stop lock that halts the rotation of the knife carrying members 4 and 5 in the normal position of Fig. 2 after the cutting operation on one length of board and before the cutting action occurs with respect to the next. As soon as the end of the severed sheet passes under the trip 18 and the latter returns to normal position, it is ready to be again tripped by the succeeding lenght of board, releasing the solenoid control stop 23 and permitting a succeeding operation of the shearing knives by a subsequent driving action of the motor 15 through the connection of the magnetic clutch 16 that is thus brought into operation.

In Fig. 4 is shown a detail of the rotary stop 23 on the shaft of the lower cutter element 5, said stop element having a shoulder 24 engaged by the stop pin 25. This stop pin 25 is normally urged to active position by a spring 26, but is withdrawn periodically as stated through the action of the solenoid coil 22 which surrounds and withdraws it at the proper time.

This stop pin or rather solenoid 22 is in circuit in series with the magnetic clutch 16, the circuit running from battery B through wire 27 to the field of the magnetic clutch 16 (which is a well known construction) and thence through wire 28 to the field of the solenoid 22; out through wire 29 to contact member 19 and thence through contact member 20 and wire 21 back to battery.

In operation, the advancing edge of the strip A is fed along to the shears by the rotation of the rolls to the left of the shears when viewed as in the drawing. When the advancing edge of the strip hits the trip 18 and closes the circuit, the solenoid 22 is energized to withdraw the stop pin 25 to permit rotation of the shears, and at the same instant the magnetic clutch 16 is energized to connect the motor 15 to the shears. The shears then rotate and sever the strip A as shown in Figure 3. The moment the strip is severed, the severed portion thereof to the right of the shears shoots forward approximately four times as fast as its previous speed, because the rollers 3 upon which it rests are driven approximately four times as fast as the rollers which feed the continuous unsevered strip. Hence the rear edge of the severed strip will pass out from under the trip 18 long before the cutters have turned a complete revolution. When the rear edge of the severed sheet passes beyond the trip, the trip again opens the circuit 21, which disengages the clutch 18 and allows the stop pin 25 to be moved by the spring 26 into its operative position to stop the shears accurately in position ready for the next operation. Subsequently the advancing edge of the continuous strip again engages the trip 18, the clutch 16 is once more engaged, and the stop pin 25 is once more withdrawn, and another portion of predetermined length is severed from the continuous strip as before.

I claim as my invention:

In a sheet severing device, the combination with a runway at the delivery end of a sheet forming machine, of a shearing device rotatable to a cutting position and traveling at a peripheral speed equal to that of the sheet operated upon, driving mechanism for the shearing device, a magnetic clutch associated with said driving mechanism, an electrically actuated stop device for said shearing device, an electric circuit including said clutch and stop device, and means also in said circuit actuated by an advancing section of sheet material for controlling said clutch and stop device.

FRANCIS W. HARNEY.